United States Patent

[11] 3,587,783

[72] Inventors Leslie K. Walters
Warren;
Lee E. Hartman, Mount Clemens, Mich.
[21] Appl. No. 880,664
[22] Filed Nov. 28, 1969
[45] Patented June 28, 1971
[73] Assignee General Motors Corporation
Detroit, Mich.

[54] POWER TRANSMISSION AND TRANSMISSION-LUBRICATING SYSTEM
8 Claims, 5 Drawing Figs.

[52] U.S. Cl. ............................................. 184/11, 184/13
[51] Int. Cl. ........................................ F01m 9/06, F16n 7/26
[50] Field of Search ............................................. 184/6, 6 (U), 11, 13, 6 (Y); 74/(Inquired)

[56] References Cited
UNITED STATES PATENTS
2,489,699 11/1949 Clark .............................. 184/11

| | | | |
|---|---|---|---|
| 2,519,122 | 8/1950 | Dence | 184/11 |
| 2,602,522 | 7/1952 | Roos | 184/11 |
| 2,822,705 | 2/1958 | Orr et al. | 184/6X |
| 3,195,682 | 7/1965 | Reneerkens | 184/6X |
| 3,508,630 | 4/1970 | Keller et al. | 184/11 |

FOREIGN PATENTS

| 69,167 | 5/1958 | France | 184/6 |
|---|---|---|---|
| 521,833 | 3/1921 | France | 184/11 |

Primary Examiner—Manuel A. Antonakas
Attorneys—W. E. Finken, A. M. Heiter and Charles R. White ABSTRACT: Synchronized transmission having a first-second shifter fork with a lubricant-directing wall on its inner surface which cooperates with a reverse gear mounted on the main shaft to form a pump for pumping transmission lubricating oil to the first gear area when the reverse gear is rotating. There is also a three-four shifter fork having lubricant-directing walls on its inner surface which direct lubricating oil coming off of the second and third speed gears and the countershaft gear onto the main shaft to lubricate the main shaft, and other transmission components.

INVENTORS
Leslie K. Walters &
BY Lee E. Hartman
Charles R. White
ATTORNEY

INVENTORS
Leslie K. Walters &
BY Lee E. Hartman
Charles L. White
ATTORNEY

POWER TRANSMISSION AND TRANSMISSION-LUBRICATING SYSTEM

This invention relates to power transmissions and more particularly to change speed gear transmissions and transmission lubricating systems.

In most prior manual transmissions lubricating and cooling of the transmission gearing and components have been accomplished by operating the countershaft gear cluster in lubricating oil. When operating, the gears of the gear cluster sling the oil in the transmission case to lubricate all of the transmission components including the main shaft and the main shaft gearing. In some transmissions special oil slingers driven by the transmission input propel the lubricating oil to transmission components. Also, lubricating passages have been provided in the gearing and other components to improve distribution of the lubricating oil. In some transmissions oil channels have been provided in the interior of the transmission housing to collect and direct lubricating oil to the bearings.

While these prior art lubricating systems for manual transmissions have been generally satisfactory, they frequently do not meet higher standards for fully lubricating and cooling transmission components such as the main shaft and first gear region. Prior to the present invention, the lubrication of the first gear region of the transmission of heavy duty vehicles such as trucks has been very difficult because of low gear tooth velocities which do not splash and spray lubricant in any great quantity at normal operating speeds. Also, lubrication of the first gear region is blocked by a rail shaft system which tends to funnel lubricants past the main shaft.

It is a feature and object of this invention to provide a new and improved transmission and lubrication system in which shifter forks break up the flow of lubricant and direct it to the main shaft and first gear region. The shifter forks of this transmission have special fluid-directing surfaces on the interior thereof which collect and direct the lubricants within the transmission and propel the lubricant toward the main shaft and particular areas of the transmission. One of the surfaces cooperates with a transmission gear element to form a lubricating pump that pumps a heavy stream of lubricating oil out of a notch in the edge of the shifter fork to the first gear area of the transmission. In this transmission another shifter fork has walls on the inner side which scrape and collect the oil and direct it onto the main shaft.

These and other features, objects and improvements will become more apparent from the following detailed description and drawings in which.

Figure 1:
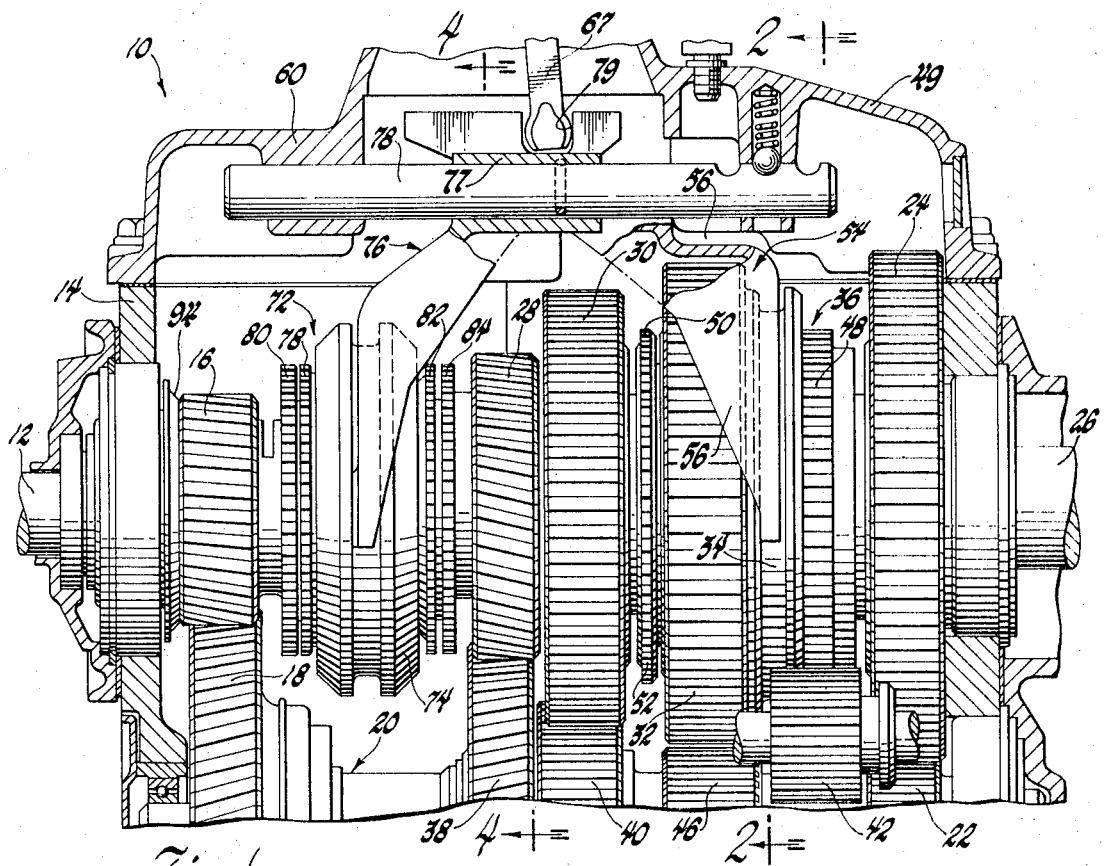
FIG. 1 is a side view partly in section of a gear change speed transmission.

In FIG. 1 there is illustrated a four-speed forward and one-speed reverse manual transmission 10 having an input shaft 12 rotatably mounted in the transmission housing 14. The input shaft is drivingly connected to a main drive gear 16 which meshes with a head gear 18 located at one end of a countershaft gear cluster 20 that is rotatably mounted in the transmission housing 14. The transmission housing has a lubricating oil therein which preferably has a level above the shaft of the countershaft gear cluster so that the gear cluster will propel lubricating oil to the transmission gearing when running. The countershaft gear cluster 20 has an output gear 22 at the other end which meshes with a first speed gear 24 rotatably mounted on the main shaft 26.

The main shaft has one end extending through the rear of transmission housing 14 to provide a transmission output while the other end is piloted in the main drive gear 16 so that there can be relative rotation between the input and the main shaft. In addition to the first speed gear 24, the main shaft carries third speed gear 28, second speed gear 30 and reverse gear 32. The second and third speed gears are rotatably mounted on the main shaft while the reverse speed gear is secured to a synchronizer collar 34 splined for axial movement on a synchronizer hub that is securely fastened to the main shaft. The synchronizer collar is between the first and second speed gears and forms part of a first and second speed synchronizer assembly 36 for clutching either of these gears to the main shaft. The third speed gear 28 meshes with third gear 38 of the gear cluster 20 and second speed gear 30 meshes with second gear 40 of the gear cluster.

For reverse, an axially slidable reverse idler 42 splined to a support shaft, is movable into mesh with the reverse gear 32 and the drive gear 46 of the gear cluster by suitable controls to establish a reverse drive. These controls include a reverse shifter rail 45 slidably mounted in transmission cover 49 and a shifter head and fork 51 secured to the rail. The shifter head is slotted so that it can be engaged and moved by a shift lever.

The shift collar 34 is internally splined and is axially movable rearwardly into engagement with the dog teeth 48 of the extending hub of first speed gear 24. Also, this shift collar is slidable forwardly past conventional blocker ring into engagement with the dog teeth 50 of second speed gear hub 52 to drivingly connect the second speed gear to the main shaft. In a predetermined position between the first and second speed gears the collar is in a neutral position and neither gear is clutched to the main shaft. The reverse gear being drivingly connected to the main shaft is rotatable with that shaft even if the reverse idler is in a neutral position.

Figures 2, 3:
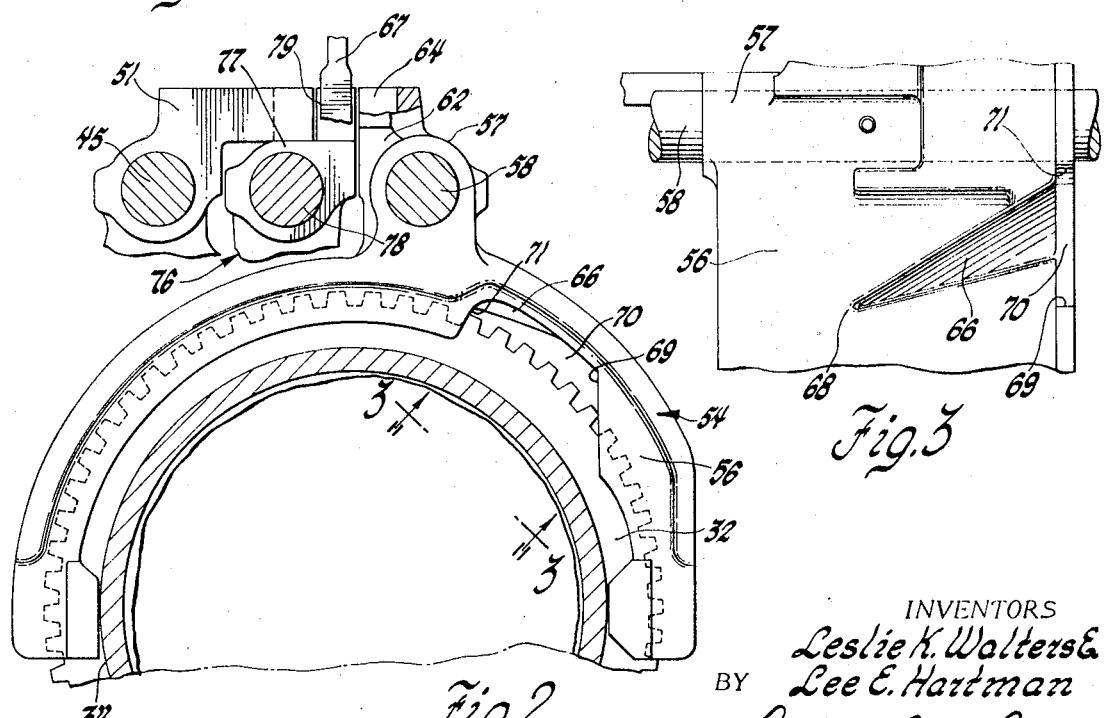
FIG. 2 is a view taken generally along the lines 2-2 of FIG. 1.
FIG. 3 is a view taken along lines 3-3 of FIG. 2.
Figure 4:
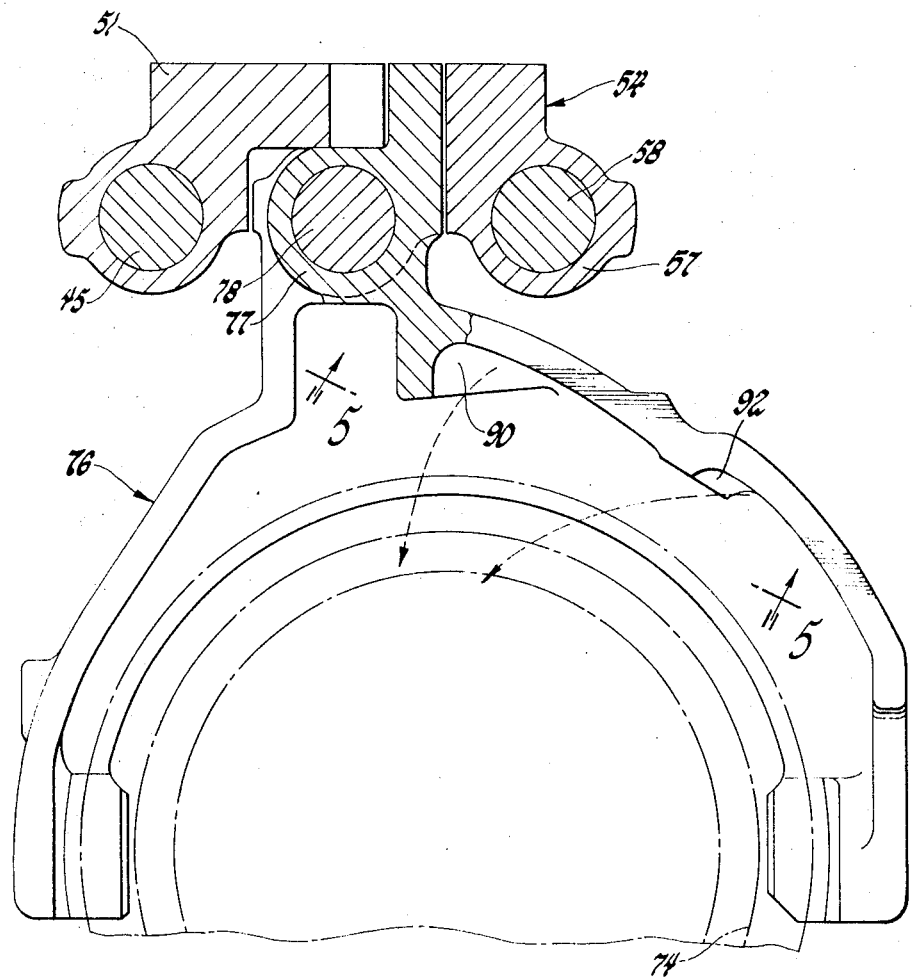
FIG. 4 is a view partly in section along the lines 4-4 of FIG. 1.

As shown by FIG. 2 there is a first-second shift fork 54 which fits in a groove formed in the shift collar 34. The shift fork has a cover or hood portion 56 that extends forwardly in the transmission and covers the upper portion of reverse gear 32. Also, shift fork 54 has an integral sleeve portion 57 which is affixed to a one-two shift rail 58 mounted for longitudinal movement in the transmission cover 49 fixed to the transmission housing 10. In addition to the sleeve described above, the shift fork 54 has an upper projection 62 which is slotted at 64 to receive the working end of the shift lever 67 movably mounted in the cover.

The under side of the hood portion 56 is formed with a generally triangular-shaped lubricant-directing wall 66 which extends from a mid point 68 on the under side of the hood, to an enlarged opening 70 formed in the face of the shift fork. The wall is inclined with respect to a horizontal line across the hood portion 56 through point 68 and forward edge 69 of opening 70 as best shown in FIG. 3 and terminates adjacent to the trailing edge 71. FIG. 2 also shows the reverse gear 32 and its relationship to the first-second shift fork.

As the reverse gear rotates in a counterclockwise direction in viewing FIG. 2, its teeth pick up and propel the lubricating oil contained within the transmission housing against the wall 66 where it is wedged out of the shift fork by wall 66 through opening 70. The oil emerges in a longitudinal stream from opening 70 directed onto first speed gear 24 and other working components in this area to fully lubricate and cool this gear and gear area. It will be understood that the reverse speed gear and the first-second shift fork cooperate to form a lubricant pump for improving the lubrication of the transmission gearing without utilizing a special or complex lubricating system.

There is also a third and fourth speed synchronizer assembly 72 mounted on the main shaft between the main drive gear 16 and the third speed gear 28. The collar 74 of this synchronizer assembly is engaged by a shift fork 76 and is movable by the shift fork forwardly past the blocker ring 78 into engagement with the dog teeth 80 of the main drive gear 16 to drivingly connect the input shaft with the main shaft. Also, the shift collar is movable rearwardly past the blocker ring 82 into engagement with the dog teeth 84 of the third speed gear to drivingly connect that gear with the main shaft. In a predetermined position between these two gears the shift collar is in its neutral position in which neither gear is connected to the main shaft.

Figure 5:
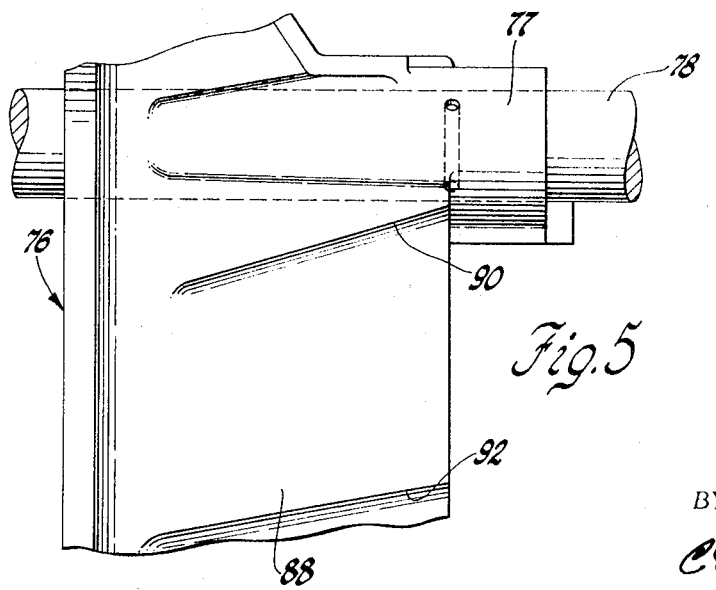
FIG. 5 is a view taken generally along the lines 5-5 of FIG. 4.

The three-four shift fork 76 has an integral sleeve portion 77 that is securely connected to the three-four shift rail 78 mounted in the transmission cover alongside the first-second shift rail. This sleeve portion has an upwardly extending projection with a slot 79 selectively engageable by the working end 67 of the shift lever to move the shift rail 78 and the connected shift fork longitudinally in the housing to effect three-four gear shifting. As best shown by FIG. 5 the shift fork 76 is formed with a wide cover portion 88 that extends rearwardly from the shift collar 74. The under side of this shift fork has inclined curved surfaces 90 and 92 formed therein which collect and direct lubricant centrifugally slung thereon mainly by the second and third speed gears as they rotate onto the main shaft as illustrated by the arrows to provide improved main shaft lubrication.

It will be appreciated that with the first-second and third-fourth shifter forks collecting centrifugally slung lubricants and redirecting the collected lubricants onto predetermined components of the transmission lubrication is materially improved. Additional lubrication of the forward end of the transmission is obtained by employing an oil slinger 94 forward of main drive gear. This oil slinger is fixedly secured to the input shaft 12 and picks up lubricating oil and slings it rearwardly onto the input gear and synchronizer assembly 72.

The gear selections are made in a conventional manner by manipulating the selector lever 67 to engage a particular slot in the shifter heads. Selection is then made by moving the shifter rail, the attached head and fork to clutch a predetermined drive gear to the transmission output shaft.

This invention is not limited to the details of the construction shown and described for purposes of illustrating the invention for other modifications will occur to those skilled in the art.

We claim:

1. In a transmission having a rotatable input member and a rotatable output member, a housing for said transmission, a change speed gear unit disposed in said housing for drivingly connecting said input member and said output member and operable to change transmission input/output speed ratios, shift means movably mounted in said housing and operatively connected to said change speed gear unit for conditioning said gear unit for a change in transmission input/output speed ratio, a lubricating oil partially filling said housing and covering a part of said gear unit, said shift means being operatively disposed adjacent to one of the gears of said change speed gear unit, said shift means having fluid-directing surface means for collecting lubricating oil centrifugally slung by components of said gear unit and for redirecting the collected lubricants onto predetermined components of said gear unit.

2. The transmission defined in claim 1 wherein said shift means are separate first and second shifter forks, each of said forks having wall means projecting from the inside thereof to provide said fluid-directing surface means, and said curved wall means of one of said forks cooperating with a gear of said unit for directing said lubricating oil radially inwardly onto said gear unit and said curved wall means of the other of said forks cooperating with a gear of said gear unit to direct said lubricating oil generally longitudinally onto a predetermined component of said transmission.

3. The transmission defined in claim 1 wherein said shift means is a shifter fork and said fluid-directing surface means comprise curved walls projecting from the inner wall of said shifter fork for directing fluid generally radially inwardly onto said gear unit.

4. The transmission defined in claim 1 wherein said shift means is a shifter fork having an opening defined by spaced first and second edges in a face of said fork, said fluid-directing surface being an inclined inner wall on said shifter fork which terminates adjacent to one of said edges, said gear unit having gear means which cooperate with said surface for pumping lubricating oil from said fork generally longitudinally onto predetermined components of said transmission.

5. In a transmission having an input and an output, a transmission housing, a lubricating oil within said housing, change speed gear means drivingly connecting said input to said output, clutch means operatively connected to said change speed gear means and said output for operating said change speed gear means and thereby changing the transmission input/output gear ratio, a gear member partially disposed in said lubricating oil and operatively connected to said output for rotation therewith, power transmitting gear means for drivingly connecting and disconnecting said gear member and said change speed gear means to establish a predetermined input/output drive ratio, gear shift means operatively connected to said change speed gear means to effect changing of said input/output gear ratio, said gear shift means being at least in part coplanar with said gear member, said gear shift means having a lubricant-directing surface therein and an opening which cooperated with said gear member to form a lubricant pump for pumping a stream of lubricating oil from said gear shift means toward a predetermined area of said transmission for lubricating transmission components in said area.

6. The transmission of claim 5 in which said change speed gear means comprises a countershaft gear cluster having a plurality of gears rotatably mounted in said housing and a plurality of gears rotatably mounted on said output which are paired with said gears of said gear cluster, said clutch means comprising synchronizer means including a shift collar for drivingly connecting and disconnecting selected pairs of said gears and said output, and said gear member being a reverse drive gear secured to said shift collar.

7. The transmission of claim 6 wherein said gear shift means comprises a shift fork operatively engaging said collar for moving said collar and clutching and unclutching selected pairs of said gears and said output, said shift fork having a curved inner wall, said lubricant directing surface comprising a generally triangular shaped wall projecting from the interior of said inner wall and inclined with respect to a line across the width of said shift fork for collecting and feeding lubricating fluid to said opening as said reverse drive gear rotates and supplies lubricating oil to said inner wall of said shift fork.

8. In a power transmission, an input and an output, a transmission housing having a lubricating oil therein, a countershaft gear cluster driven by said input, first and second gears rotatably mounted on said output, means for clutching said first and second gears to said output including a shifter collar and a shifter fork, gear means adapted to be drivingly connected to said countershaft gear cluster for driving said output, said gear means being operatively disposed between said first and second gears driven by said output, said gear means and said shifter fork cooperating to form a pump which pumps lubricating oil from said fork directly onto said first gear.